UNITED STATES PATENT OFFICE.

IVAR KNUT LINDSTROM, OF AKERBY OREBRO, ASSIGNOR TO THE AKTIE-BOLAGET SEPARATOR, OF STOCKHOLM, SWEDEN.

METHOD OF TESTING MILK.

SPECIFICATION forming part of Letters Patent No. 531,049, dated December 18, 1894.

Application filed May 25, 1893. Serial No. 475,430. (No specimens.) Patented in England December 28, 1889, No. 20,859.

*To all whom it may concern:*

Be it known that I, IVAR KNUT LINDSTROM, a subject of the King of Sweden and Norway, residing at Akerby Orebro, Sweden, have invented new and useful Improvements in Methods of Testing Milk, (for which I have obtained Letters Patent of Great Britain, No. 20,859, dated December 28, 1889,) of which the following is a specification.

This invention relates to that method of testing milk for determining the percentage of butter fat contained therein, which consists in treating the milk with an acid to dissolve the casein and then subjecting the mixture to centrifugal action for collecting the fat. The object of my invention is to collect the fat in a solid state, so that the result of the test can be more accurately observed and can be read off many hours after the test has been made.

In practicing my invention the milk to be tested is mixed with about an equal quantity of a suitable solvent for the casein, for instance, concentrated hydrochloric acid, or a mixture of concentrated hydrochloric with acetic or sulphuric acids, and is well shaken so that the casein may be well separated. A small quantity of this mixture is then placed in a small test glass, closed at one end and provided with a shouldered stopper at the other, and suitably graduated in a well known manner. This glass is filled with the mixture and then placed in a water bath and subjected to a boiling temperature for about fifteen minutes. Usually a large number of such test glasses, eighty or thereabout, are filled with these milk mixtures at the same time. The mixtures in these glasses are then subjected to centrifugal action, in a suitable centrifugal machine, for instance, a De Laval separator, preferably by placing the glasses in a holder which is secured in the bowl of the separator, so that the closed ends of the glasses are arranged outwardly and so that water can circulate around the glasses. A holder suitable for this purpose is described and claimed in a pending application for Letters Patent filed by me January 16, 1890, Serial No. 337,120½. After the holder has been placed in the centrifugal machine, the latter is set in motion, the speed ranging in different machines, suitable for this purpose, from two thousand to six thousand revolutions per minute, or thereabout. While the liquid is being so subjected to centrifugal action, warm water is caused to flow through the bowl of the centrifugal machine, preferably by causing it to enter through the feed pipe and allowing it to escape through the skim milk or cream discharge, or both. This water has a temperature sufficiently high to melt the separated butter fat, usually from 55° to 80° centigrade. The introduction of water at this temperature continues for about five minutes, when the supply of warm water is shut off and cold water is supplied, having a temperature sufficiently low to solidify the separated fat, which temperature is usually from 8° to 10° centigrade. The supply of cold water is continued for about five minutes, when the machine is stopped and the test glasses are removed. The butter fat is found to be deposited in a solid semi-transparent layer or film having distinct edges which can be easily observed and readily read off on the scale. This solidified fat remains in that condition for many hours and the tests can therefore be read off and compared many hours after they have been made.

The layer of butter fat becomes solidified while it is under the influence of centrifugal force and its upper and lower surfaces therefore stand at right angles to the axis of the test glass and are sharply defined and cannot change their position in removing the test glass from the centrifugal machine and in handling it afterward, whereby the result is indicated with accuracy and can be easily read off.

I claim as my invention—

The herein described method of testing milk which consists in mixing the milk with a solvent of casein, heating the mixture to the melting point of the fat, subjecting the mixture to centrifugal action, and finally solidifying the fat by cooling it with cold water while the mixture is under centrifugal action, substantially as set forth.

Witness my hand this 8th day of May, 1893.

IVAR KNUT LINDSTROM.

Witnesses:
E. HAASE,
CARL ARBERG.